June 28, 1966  J. R. KIRK  3,258,240
SEAT SLIDE
Filed Jan. 27, 1964  4 Sheets-Sheet 3
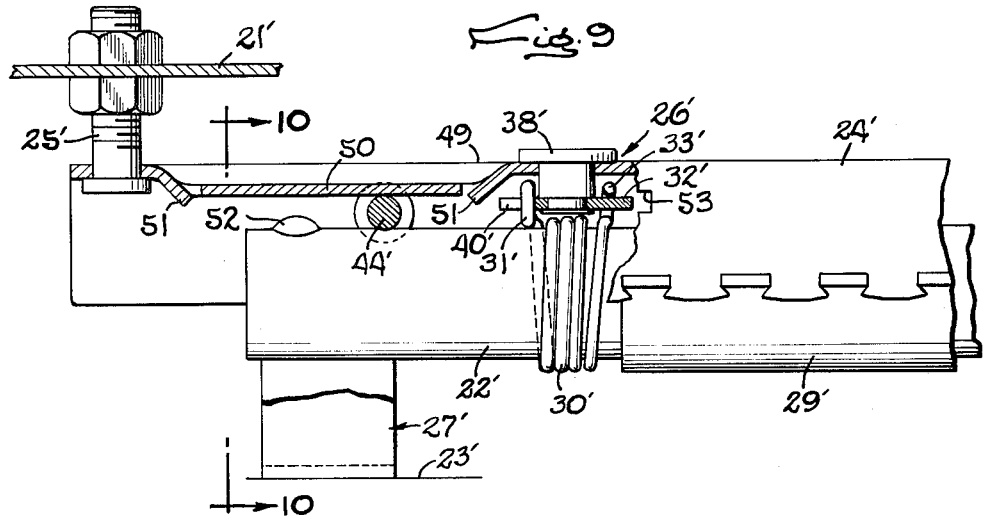
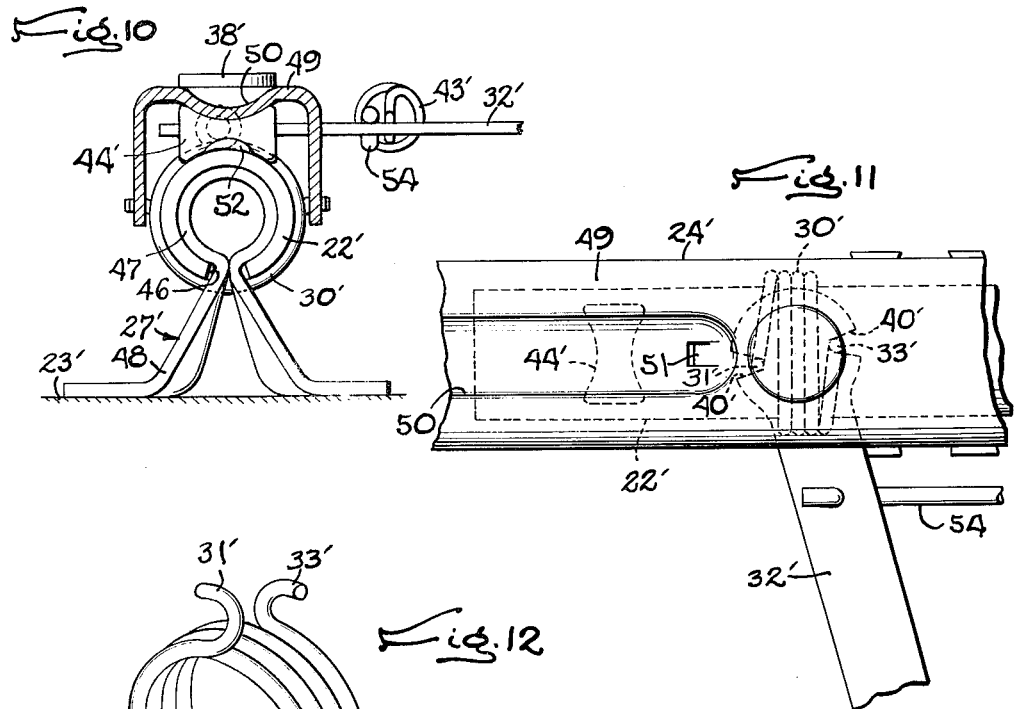
INVENTOR
Joseph R. Kirk
by Wolfe, Hubbard, Voit & Osann
ATTORNEY June 28, 1966 J. R. KIRK 3,258,240
SEAT SLIDE
Filed Jan. 27, 1964 4 Sheets-Sheet 4
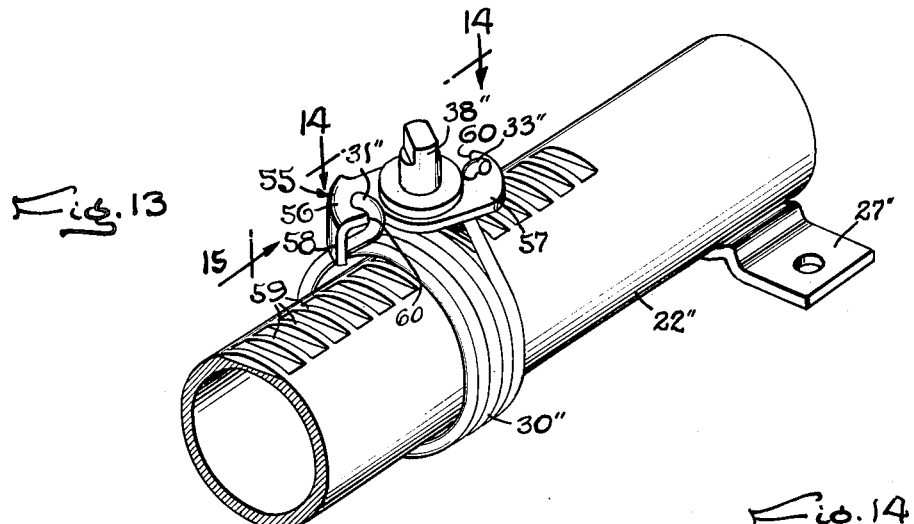
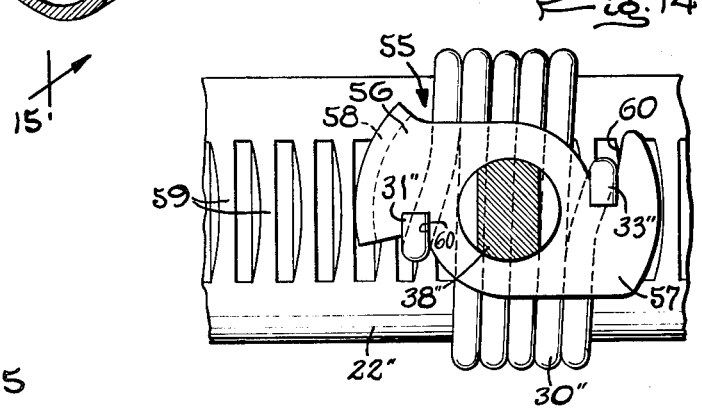
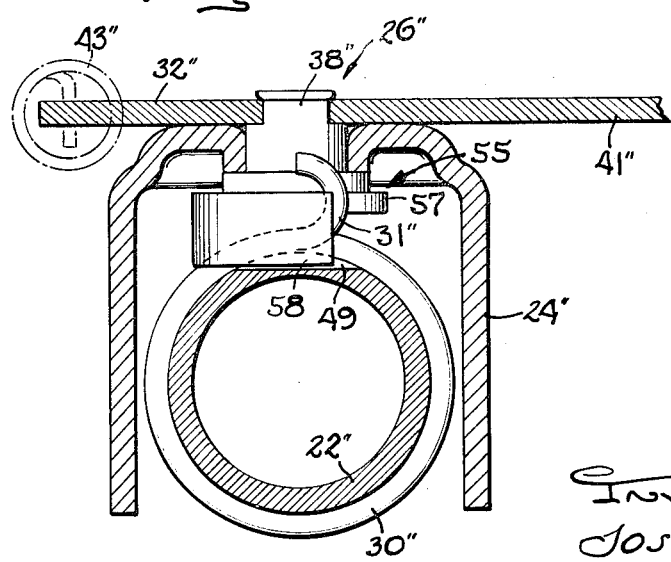
INVENTOR
Joseph R. Kirk
by Wolfe, Hubbard, Voit & Osann
ATTORNEYS United States Patent Office 3,258,240
Patented June 28, 1966

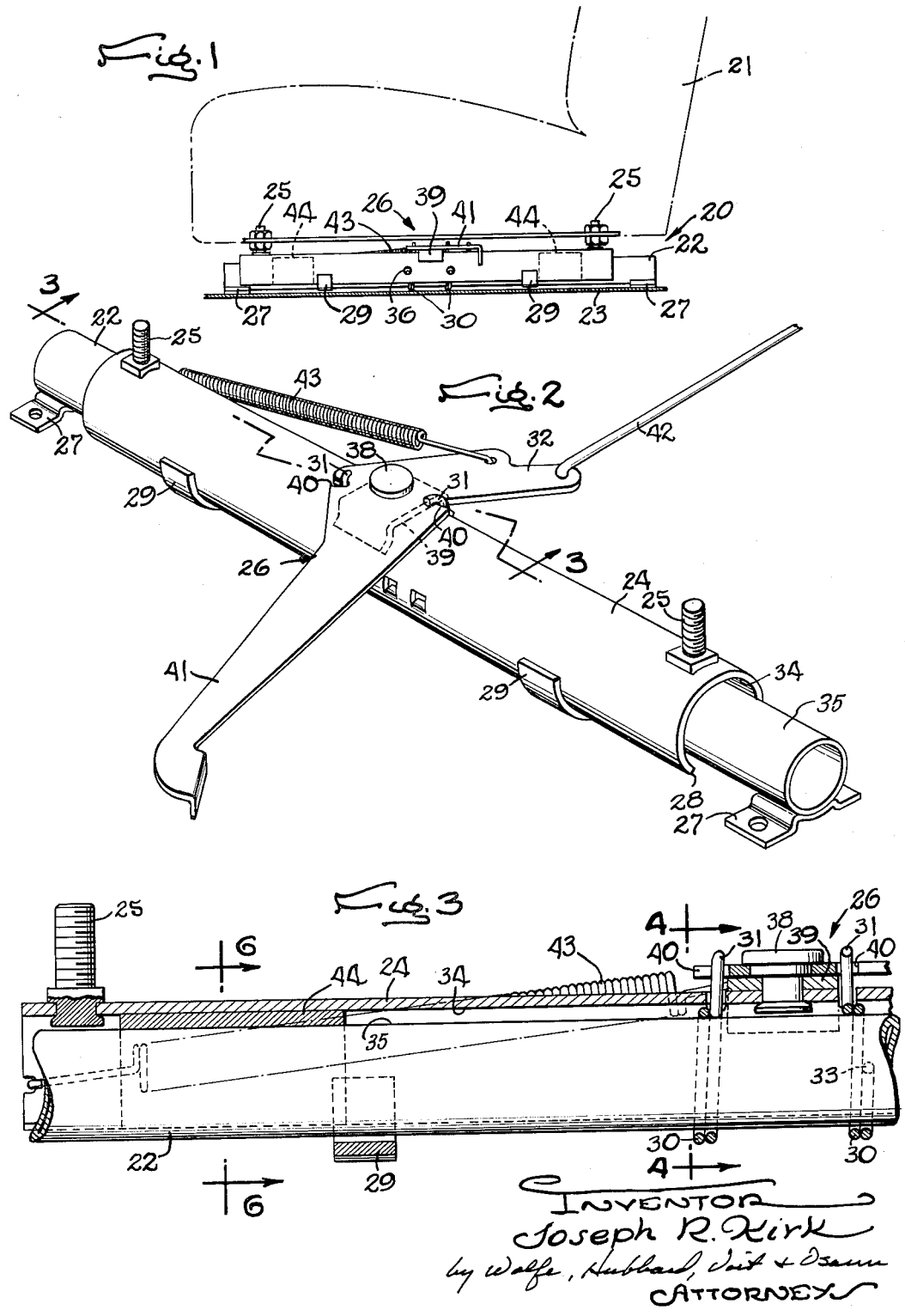

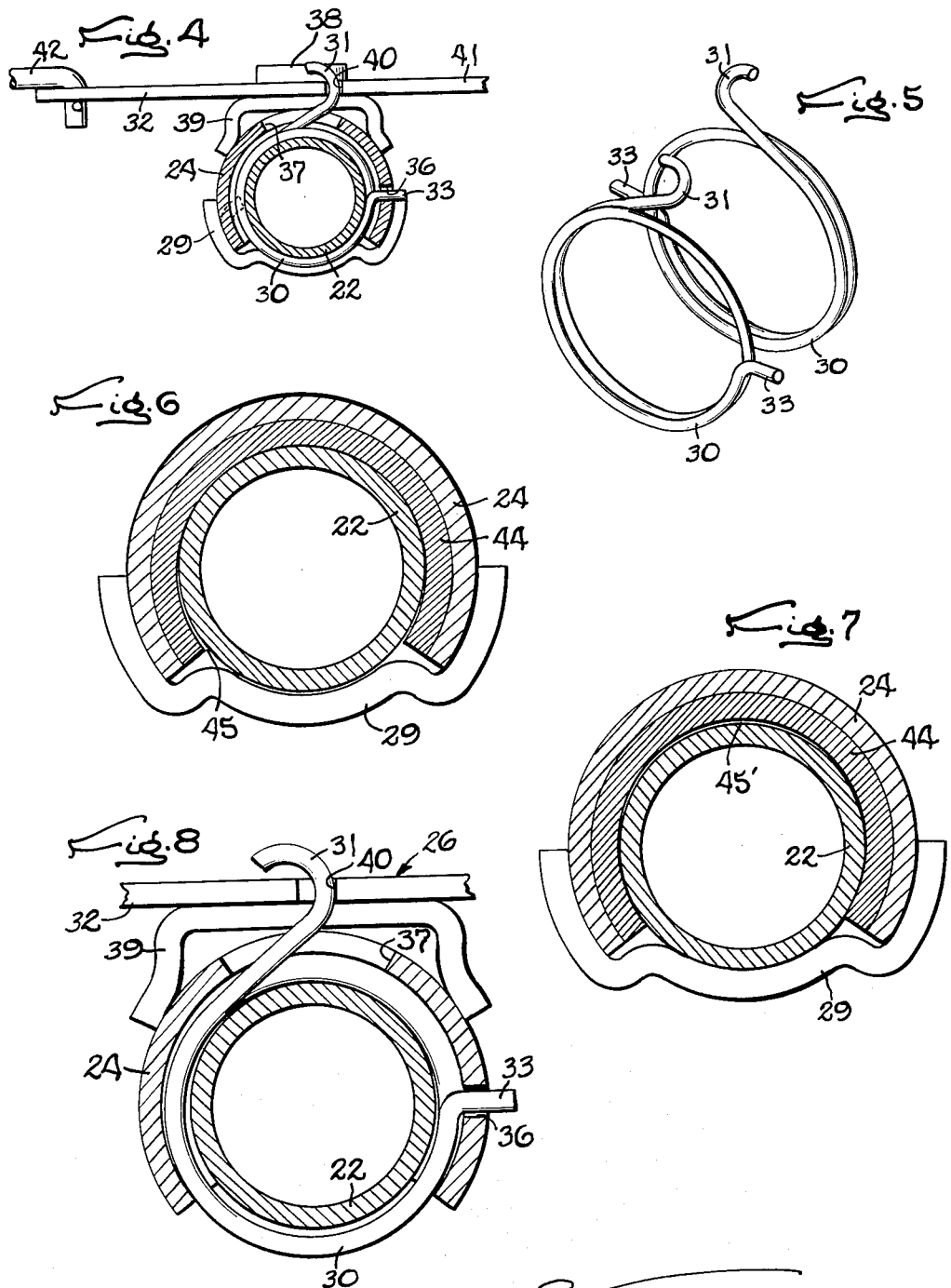

3,258,240
SEAT SLIDE
Joseph R. Kirk, Rockford, Ill., assignor to Atwood
Vacuum Machine Company, Rockford, Ill.
Filed Jan. 27, 1964, Ser. No. 340,150
4 Claims. (Cl. 248—430)

This invention relates to a seat slide and, particularly, to a seat slide of the type commonly used in automotive vehicles and the like. Such a slide usually includes a track secured to the vehicle floor and a carriage fastened to the seat and sliding on the track to permit the position of the seat to be adjusted as desired. A manual latch acting between the carriage and the slide is selectively operable to lock the carriage against sliding or to release the carriage for adjustment of the seat position.

The general object of the invention is to provide a new and improved seat slide in which the carriage slides freely on the track when the latch is released but which eliminates any chucking of the seat when the latch is in the locking position.

A more detailed object is to achieve the foregoing by ararnging the slide so that, when the latch is in the locking position, a loading force is applied to the slide, that is, a force which holds the slide firmly on the track so there is no play between the parts, but the loading force is removed when the latch is released.

Another object is to produce the loading force between the carriage and the track by means of a flexible element which extends around one of these parts and is connected to the other part so that the flexible element may, in effect, be shortened selectively and such shortening draws the carriage and the track firmly together.

A further object is to use the flexible element not only for the purpose of applying the loading force but also as a frictional gripping element which holds the carriage against sliding on the track.

The invention also resides in the novel manner of combining the flexible element with a positive latching means for preventing sliding of the carriage.

Other objects and advantages of the invention will become apparent from the following detailed description taken in connection with the accompanying drawings, in which FIGURE 1 is a side elevational view of a seat slide embodying the novel features of the present invention.

FIG. 2 is an enlarged perspective view of the seat slide.

FIG. 3 is an enlarged fragmentary sectional view taken along the line 3—3 in FIG. 2.

FIG. 4 is a fragmentary sectional view taken along the line 4—4 in FIG. 3.

FIG. 5 is a perspective view of the flexible elements.

FIG. 6 is an enlarged sectional view taken along the line 6—6 in FIG. 3.

FIG. 7 is a view similar to FIG. 6 but shows the parts in a moved position.

FIG. 8 is an enlarged view similar to FIG. 4 but shows the parts in a moved position.

FIG. 9 is a fragmentary side elevational view of a modified form of the invention, parts being broken away and shown in section.

FIG. 10 is a sectional view taken along the line 10—10 in FIG. 9.

FIG. 11 is a fragmentary plan view of the modified form of seat slide.

FIG. 12 is a perspective view of the flexible element as viewed in the modified form.

FIG. 13 is a fragmentary perspective view of another modified form of the invention.

FIG. 14 is an enlarged sectional view taken along the line 14—14 in FIG. 13.

FIG. 15 is an enlarged sectional view taken along the line 15—15 in FIG. 13.

As shown in the drawings for purposes of illustration, the invention is embodied in a seat slide 20 adapted to support the seat 21 of an automotive vehicle for fore and aft adjustment. As is customary with such an arrangement, two slides are used, one at each side of the seat, and each slide includes a horizontal guide or track 22 secured to the floor 23 of the vehicle and a cooperating slide member or carriage 24 fastened to the underside of the seat by means of threaded studs 25. Thus, the position of the seat may be adjusted by sliding the carriage endwise on the track and the seat is secured in the adjusted position by a manually operable latch 26 which locks the carriage against sliding.

In the present instance, the track 22 is in the form of an elongated, hollow cylinder. Brackets 27 are secured rigidly to the underside of the cylinder 22 at each end thereof and these brackets are used to mount the cylinder on the vehicle floor. The carriage 24 is a tube telescoping with the cylinder and is open along the underside as indicated at 28, the open space being spanned by spaced straps 29 which engage the brackets 27 and limit the ultimate endwise sliding of the carriage.

In prior seat slides, the carriage 24 has been preloaded to take up any play between the carriage and the track 22 and prevent rocking of the seat 21, known as chucking. For example, roller bearings or ball bearings are disposed between opposed, horizontal surfaces on the carriage and the track and stress these parts to hold the carriage down firmly on the track. Such preloading, however, makes it more difficult to slide the carriage in spite of the use of bearings. Moreover, the bearings ultimately cause wear in the surfaces on which they roll and, eventually, this wear introduces the undesirable chucking action.

In accordance with the present invention, the seat slide 20 is constructed in a novel manner so that, when the latch 26 is released for adjustment of the position of the seat 21, there is no loading of the carriage 24 which thus slides freely on the track 22 but, when the latch is locked, the carriage is held firmly against transverse movement relative to the track to prevent chucking. This is achieved by arranging the latch to perform two functions. First, the latch serves the usual purpose of locking the carriage against endwise movement along the track and, second, it performs the additional function of urging the carriage transversely whereby the latter is rigidly held relative to the track. Conversely, when the latch is moved to the unlocked position, not only is the carriage released for longitudinal sliding but also the transverse loading is removed to achieve a free sliding of the carriage.

While the latch 26 may take various forms, it includes, in the preferred embodiment of the invention, an elongated flexible element 30 (FIG. 3) which is wrapped around the track 22 with at least one end 31 connected to a manual operator 32 and the other end 33 suitably anchored. The operator 32 is mounted on the carriage 24 and is movable between locked and unlocked positions. As the operator is moved to the locked position, it draws the element tightly around the track thus effectively shortening the element and the latter, in turn, holds the carriage down on the track so that inner surface 34 of the carriage is retained in a fixed position relative to the outer surface 35 of the track. By virtue of the tight wrapping of the element 30 around the track, the element frictionally grips the track and holds the carriage in the selected position. At the same time, the flexible element loads the carriage transversely and prevents the seat 20 from chucking when the latch 26 is locked.

In the present instance, the flexible element 30 is a wire spring coiled around the track 22 and, preferably, two such springs are used and are spaced a short distance apart on opposite sides of the mid-point of the carriage 24. As shown in FIGS. 4 and 5, the springs are coiled in opposite directions and the ends 33 are anchored by being bent to project horizontally into holes 36 in the sides of the carriage. The other ends 31 of the springs 30 project upwardly from the top of the track and through individual holes 37 in the upper side of the carriage.

The ends 31 of the springs 30 are connected to the operator 32 which, herein, is a horizontal lever fulcrumed to turn about a vertical axis by a pin 38, the lever being supported on top of the carriage by means of a bearing plate 39. The spring ends 31 are given a hook shape and are received in notches 40 cut in the edges of the lever 32 on opposite sides of the fulcrum pin 38. Thus, by turning the lever counterclockwise as viewed in FIG. 1, the springs 30 are wound up to be tight around the track 22 and to hold the carriage down firmly on the track. A handle 41 (FIG. 2) projects laterally from the lever of one of the seat slides to turn that lever and the levers of the two slides are connected by a link 42 so that both levers turn together. A contractile spring 43 has one end anchored to the end of the carriage and the other end to the lever 32 to urge the latter in the counterclockwise direction, that is, toward the locking position. The latch 26 is released by using the handle 41 to turn the lever 32 against the action of the spring 43.

Preferably, the free sliding of the carriage 24 is insured by the use of bearings 44 interposed between the surfaces 34 and 35 of the carriage and the track 22 so that the carriage slides on these bearings. In the form illustrated in FIGS. 1 through 8, are partial cylinders of a material such as molded nylon secured to the inner surface 34 of the carriage. Two such bearings are used with one disposed just inside of each of the studs 25.

The action of the new seat slide may be understood best by reference to FIGS. 6, 7 and 8 in which clearances and movements have been exaggerated for purposes of illustration. When the latch 26 is released, the bearings 44 in the carriage 24 rest on the top of the track 22. The outside diameter of the track is slightly less than the inside diameter of the bearings leaving a clearance 45 which increases gradually toward the underside of the track as shown in FIG. 6. This clearance is conducive to the free sliding of the carriage but it also permits the carriage to shift slightly up and down as illustrated in FIG. 7 by the clearance 45' above the track. Such vertical shifting, if permitted, results in the undesirable chucking action.

The chucking action, of course, is not detrimental while the position of the seat 21 is being adjusted but only when the seat is locked in the desired position. Accordingly, when the latch 26 is unlocked, the springs 30 are unwound to produce clearance around the track 22 as shown in FIG. 8. After the seat has been moved to the new position, however, the springs are wound up to grip the track frictionally and also to hold the bearings 44 tightly down on the top of the track. This prevents the carriage from moving either longitudinally or transversely of the track.

A modified form of the invention is illustrated in FIGS. 9 through 12 in which the corresponding parts are indicated by the same but primed reference characters. As in the preferred form, the track 22' is a hollow cylinder but, in this case, the cylinder is split along its lower side as indicated at 46 to receive the mounting brackets 27'. The latter are sheet metal stampings and each includes a cylindrical portion 47 (FIG. 10) received within the track and depending legs 48 which project through the slit 46 and flare outwardly for mounting on the vehicle floor 23'. Again, the carriage 24' telescopes with the track 22' but the upper or principal portion of the carriage is an inverted channel whose legs are attached to a semi-cylindrical strap 29' extending under the track.

Instead of using fixed sleeves, the bearings 44' in this case are rollers formed with concave peripheries which conform to and ride on the upper side of the track 22'. Along each end portion of the carriage 24', the crosspiece 49 of the channel is bowed downwardly to provide a portion 50 which mates with the upper side of the roller 44' so that the latter rolls between this portion and the track. Ears 51 are struck down from the channel 24' at each end of the bowed portion 50 to engage the roller 44' and limit the movement of the carriage relative to the roller in both directions. A stop 52 rigid with the track adjacent the end thereof is engaged by the roller and prevents the latter from rolling off the end of the track. A similar arrangement of ears 51 and a stop 52 are disposed at the opposite end of the slide.

Rather than two flexible elements, only a single element 30' is employed and this is in the form of a coil spring wrapped several times around the track. Both ends 31' and 33' of the spring 30' are anchored to the lever 32' on opposite sides of the pivot pin 38' and, in this instance, the lever 32' is disposed between the channel 24' and the track and projects horizontally through a slot 53 in the side of the channel. With the lever inside the carriage 24', the assembly of the slide is simplified somewhat since it is unnecessary to thread the spring ends up through the carriage. If the slide is comparatively long, the spring 30' may be located near one end of the carriage in which case a second and similar spring (not shown) is disposed near the other end and the two levers 32' are connected by a link 54 to swing in unison. As in the preferred form, a contractile spring 43' acting between one of the levers 32' and the end of the carriage urges the latch 26' to the locking position.

Basically, the operation of this embodiment is the same as the first. Thus, when the levers 32' are turned against the action of the contractile spring 43', the springs 30' expand and leave the carriage 24' free for sliding on the track 22'. When the levers are turned back by the contractile spring, the springs 30' contract and this first results in the springs frictionally gripping the track to prevent longitudinal movement of the carriage. Further contraction of the springs loads the slide, that is, it draws the carriage 24' tightly down on the roller bearings 44' and the bearings down on the track.

While the first two embodiments use the flexible elements for both locking the carriage and loading the slide, the carriage may be locked positively and the flexible element serves only the loading function. Such an arrangement is illustrated in FIGS. 13, 14 and 15 in which the same but double primed reference characters are used to indicate the corresponding parts. In this case the operating lever 32" of the latch 26" is mounted on top of the carriage 24" and is fulcrumed on the latter by a pin 38" journaled in the carriage. Fast on the lower end of the pin is a second lever 55 having arms 56 and 57 projecting radially in opposite directions from the pin to turn with the lever 32". A finger 58 bent downwardly from the outer end of the arm 56 is operable when the lever 55 is turned, to move in between two of a series of teeth 59 formed on the upper side of the track 22" and this positively latches the carriage 24" against longitudinal movement.

The coil spring 30" has several turns extending around the track 22" and the ends 31" and 33" of the spring are hooked into notches 60 in the arms 56 and 57 of the lever 55 so that the spring is expanded and contracted by turning the lever 32" back and forth. When the spring is expanded, the convolutions of the spring pass freely around the track and clear of the teeth 59, and at this time, the lever 55 is turned so that the finger 58 is out of engagement with the teeth as shown in FIG. 13. In this condition of the slide, the carriage 24" may be moved easily to any desired position. When that position is reached, the lever 55 is turned counterclockwise as viewed in FIG. 14. This brings the finger 58 into engagement with the teeth 59 to lock the carriage and, at the same time, it contracts the spring 30″ to load the slide in the same manner as in the other embodiments.

It will be observed that, with the invention, the only time there is any loading of the seat slide 20 is when the latch 26 is in the locking position and, at that time, such loading effectively takes up the play between the parts and prevents chucking of the seat. When the latch is moved to the unlocked position, however, the loading is released and the carriage 24 slides freely and easily on the track 22. This result is achieved whether the latching of the seat 21 is accomplished frictionally as in FIGS. 1 through 12 or positively as in FIGS. 13, 14 and 15.

I claim as my invention:

1. In a seat slide, the combination of, two elongated cylindrical members loosely telescoping with each other, one of said members constituting a stationary guide and the other of said members constituting a slide adapted to be fastened to a seat and slidable lengthwise of the guide, a first and upwardly facing surface formed on said guide and extending longitudinally thereof, a second and downwardly facing surface opposing said first surface and formed on said slide to extend longitudinally thereof, a wire spring coiled around the inner one of said members, a lever fulcrumed on the other one of said members, the end portions of said spring being connected to said lever on opposite sides of the fulcrum of the lever whereby turning of the lever wraps the spring tightly about the inner member and draws said second surface toward said first surface to hold said slide against both longitudinal and transverse movement.

2. In a seat slide, the combination of, two elongated cylindrical members loosely telescoping with each other, one of said members constituting a stationary guide and the other of said members constituting a slide adapted to be fastened to a seat and slidable lengthwise of the guide, a first and upwardly facing surface formed on said guide and extending longitudinally thereof, a second and downwardly facing surface opposing said first surface and formed on said slide to extend longitudinally thereof, a latch including a lever fulcrumed on one of said members, an elongated flexible element wrapped around the other of said members and having an end portion connected to said lever, means for anchoring the other end of said element whereby turning of said lever wraps the element tightly about said one member and draws said second surface toward said first surface to hold said slide against transverse movement, and first and second interlocking parts each carried by one of said members and selectively engageable to lock said slide against longitudinal movement, one of said parts being connected to said lever to engage the other of said parts when said lever is turned to tighten said element.

3. In a seat slide, the combination of, two elongated members loosely telescoping with each other, one of said members constituting a stationary guide and the other of said members constituting a slide adapted to be fastened to a seat and slidable lengthwise of the guide, a first and upwardly facing surface formed on said guide and extending longitudinally thereof, a second and downwardly facing surface opposing said first surface and formed on said slide to extend longitudinally thereof, mechanism coupled to both of said members and movable between active and inactive positions, said mechanism being operable in said active position to urge said second surface toward said first surface and hold the slide against transverse movement relative to said guide, and means operable automatically as an incident to the movement of said mechanism to said active position to latch said slide against longitudinal movement relative to said guide.

4. The combination as defined in claim 3 in which said means includes coacting teeth connected respectively to said guide and to said slide.

References Cited by the Examiner

UNITED STATES PATENTS

| 2,750,994 | 6/1956 | Howell | 248—355 |
| 3,007,668 | 11/1961 | Dall | 248—429 |

FOREIGN PATENTS

| 839,713 | 1/1939 | France. | |

CLAUDE A. LE ROY, *Primary Examiner.*

J. H. LACHEEN, R. P. SEITTER,
*Assistant Examiners.*